United States Patent [19]
Podvin et al.

[11] 3,944,457
[45] Mar. 16, 1976

[54] STRIP MATERIAL APPLYING DEVICE

[75] Inventors: Richard T. Podvin, Fridley; Thomas F. Look, New Brighton, both of Minn.

[73] Assignee: Minnesota Mining and Manufacturing Company, St. Paul, Minn.

[22] Filed: Aug. 29, 1974

[21] Appl. No.: 501,609

[52] U.S. Cl. .................. 156/405; 156/116
[51] Int. Cl.² ................. B29H 17/02; B29H 21/02
[58] Field of Search ............ 156/116, 394 R, 405 R, 156/406

[56] References Cited
UNITED STATES PATENTS

| | | | |
|---|---|---|---|
| 1,124,412 | 1/1915 | Gammeter | 156/405 |
| 1,255,073 | 1/1918 | Abbott, Jr. | 156/405 X |
| 1,327,910 | 1/1920 | Harsel | 156/405 X |
| 1,419,064 | 6/1922 | Landon | 156/405 |
| 1,448,286 | 3/1923 | Comstock | 156/116 |
| 1,748,299 | 2/1930 | Maynard | 156/394 |
| 2,665,757 | 1/1954 | Stevens et al. | 156/405 X |
| 2,985,216 | 5/1961 | Williams et al. | 156/116 |
| 3,162,562 | 12/1964 | Wenger et al. | 156/406 |
| 3,595,724 | 7/1971 | Le Blond | 156/405 |
| 3,728,181 | 4/1973 | Simmons, Jr. | 156/405 |

Primary Examiner—Douglas J. Drummond
Assistant Examiner—John E. Kittle
Attorney, Agent, or Firm—Alexander, Sell, Steldt & DeLaHunt

[57] ABSTRACT

A device including two head assemblies for applying parallel lengths of elastic reflex-light reflective strip material in a controlled stretched condition around the outer surface of a tire casing rotated past the head assemblies. Each head assembly includes an applying wheel and a mechanism for advancing an end of a supply length of the strip material from a cutting mechanism to the applying wheel as the device moves the applying wheel to press the strip material against the moving tire casing and apply the same while the assembly provides a regulated tension in the strip material being applied. The device also includes means for sensing the end of an applied length of strip material as it returns toward the applying station, and for operating the severing mechanism to provide a predetermined overlap for the ends of the strip material applied around the tire casing.

14 Claims, 12 Drawing Figures

STRIP MATERIAL APPLYING DEVICE

BACKGROUND OF THE INVENTION

1. Field of the Invention

The present invention relates to devices for applying strips of material to a surface, and in one aspect to devices for applying strips of reflex-light reflective material around tire casings.

2. Description of the Prior Art

Tires including reflex-light reflective strips around their sidewalls (as taught in U.S. Pat. No. 2,382,908) have found particular acceptance for use on bicycles and motorcycles to provide a measure of safety when the cycle is operated after dark. Such tires are typically constructed by adhering parallel strips of an uncured elastomer (such as neoprene rubber) supporting a layer of reflex-reflective elements to the solvent tackified adhesive coated outer surface of an unvulcanized tire casing. The tire casing is then vulcanized in a tire mold to form a completed tire having a U-shaped cross section with tread, embossed brand and size information and the strips permanently incorporated in its sidewalls.

A known prior art device for applying such strip material to an unvulcanized tire casing is the device illustrated in Drawing No. TR-175 which is available from the Special Enterprises Department of Minnesota Mining and Manufacturing Company, Saint Paul, Minn. This device includes two parallel head assemblies each manually movable into engagement with a casing at a fixed applying station defined along means for rotating the tire casing (e.g. a tire building wheel). These head assemblies each include fixed guide means which defines a path for a length of the strip material from a supply reel to the periphery of an applying wheel, and means along the path for separating a protective liner from the strip material. A partial vacuum is provided in openings around the periphery of the applying wheel to support an end of the strip material thereon when the head is not at the applying station. When the head is manually moved to the applying station, the applying wheel presses and adheres the strip material against the tire casing so that movement of the tire casing pulls the strip from the supply roll and applies it around the casing.

While this device is serviceable, it does not provide means for regulating the amount of stretch in the applied strip material so that the stretch in the strip material can be matched to the stretch in the tire casing at the point of application. For examples of this problem, if such stretching exceeds 3 to 5 percent when the strip material is applied to a tire casing on a circular tire building wheel it can cause partial release of the reflex-reflective material and cracking of the strip material when the tire casing is vulcanized. When the strip material is applied to a tire casing on the periphery of one pulley in the "Mono-Band" type of tire builder having spaced pulleys between which the tire casing is tensioned in the manner of a drive belt, the stretch may need to be in the range of 10 to 15 percent or higher. If it is too low, spaced lengths of the applied strip material will pop away from the tire casing and form projecting loops after the tire casing is removed from the pulleys.

Also an operator using the aforementioned device has to manually sever the strip material after it is applied around a tire casing, so that obtaining a desired relative position between the ends of the applied strip is time consuming, tedious, and highly dependent on the care taken by the operator.

SUMMARY OF THE INVENTION

The present invention provides a highly automated device for applying strip material to a surface, which device is particularly adapted for applying parallel strips of elastic reflex-light reflective material to tire casings. The device can apply elastic strip material in a closely controlled stretched condition to match any stretch in the surface to which it is applied, and provides precise relative positioning for the ends of strips applied around an endless surface which, for a tire casing, will consistently provide a desired appearance for the seam in the strip material after the tire is vulcanized.

According to the present invention there is provided a device generally of the type previously described, but which is automated to successively apply strips of reflex-reflective material to an unvulcanized tire casing.

Unlike the previously described device, the present invention includes a severing mechanism along the path for severing an applied length of strip material from the supply length at a precisely determined position in response to a sensing means activated by the first applied end of the strip material as it returns to the applying station. This provides a predetermined relationship between the ends of the strip material independent of the length of the applied strip material. Also the present invention includes a mechanism for advancing an end of the strip material from the severing mechanism to the applying wheel which properly positions the end of the strip material between the applying wheel and a tire casing as the head is moved to the applying station without the need for a vacuum through the periphery of the applying wheel, as is used in the previously described device.

Unlike the previously described device, the present invention also provides means for closely controlling the tension in the applied strip material within a predetermined range. This tension regulating means includes a novel tension regulating device along the path and a special reel mounting assembly which allows free rotation of the reel while tape is withdrawn, but brakes the reel when sufficient tape is supplied, as at the end of an application cycle to prevent spilling of strip material from the spool.

Also the device includes a novel solvent application device adapted to automatically apply solvent to the tire casing prior to application of the strip material to afford adhesive contact between the tire casing and the strip material.

BRIEF DESCRIPTION OF THE DRAWING

The present invention will be further described with reference to the accompanying drawing wherein like numbers refer to like parts in the several views, and wherein.

DESCRIPTION OF THE PREFERRED EMBODIMENT

Figure 1:
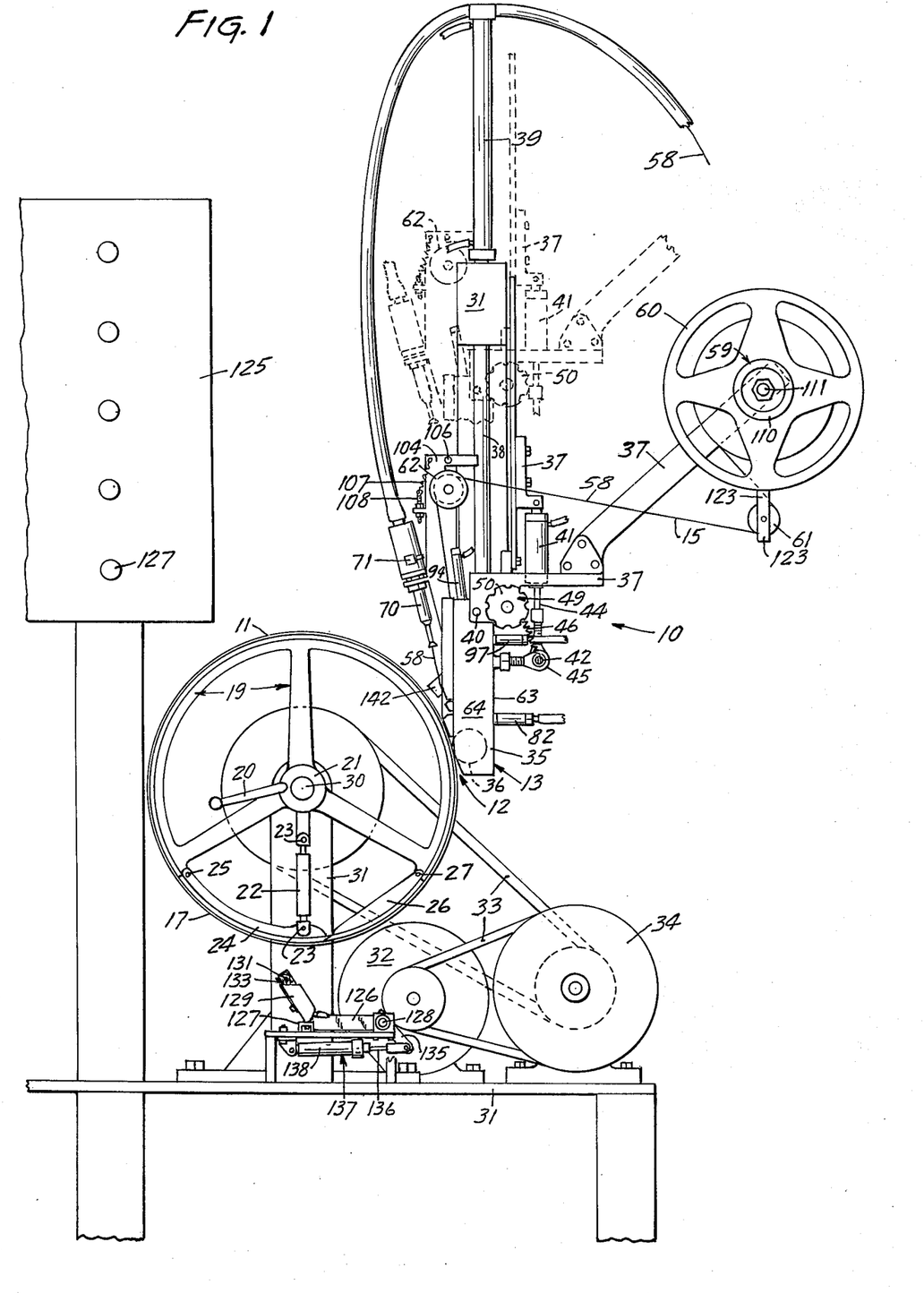
FIG. 1 is a vertical side view of a device according to the present invention for applying strip material.
Figure 2:
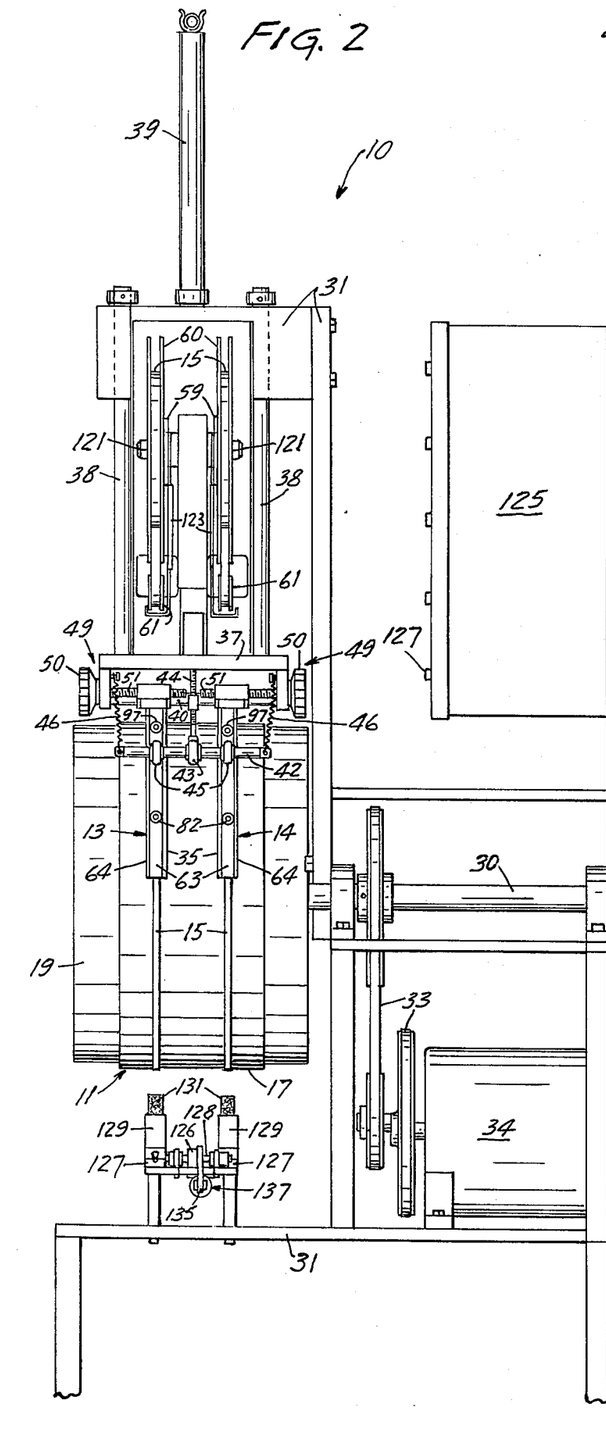
FIG. 2 is a vertical front view of the device of FIG. 1.

Referring now to FIGS. 1 and 2 of the drawing there is illustrated a device according to the present invention generally designated by the numeral 10.

The device 10 includes means for driving an unvulcanized tire casing 11 along a predetermined path, and first and second spaced strip applying head assemblies 13 and 14 adapted to move to a predetermined position or applying station 12 along the predetermined path and apply spaced lengths of a reflex-reflective strip material 15 to the tire casing 11.

As illustrated the tire casing 11 to which the strip material 15 is applied is an unvulcanized bicycle tire comprising a continuous belt-like length of cord and synthetic or natural rubber, having at each edge an inwardly projecting bead and a generally flat continuous outer surface 17 which will be formed into the tread and sidewalls of the bicycle tire in the vulcanizing process. The casing 11 is supported on a circular tire-building wheel 19 of a well known type, which has a groove around its periphery adapted to receive and support the tire casing 11 in a taut condition. An over center mechanism operated by a handle 20 fixed to a relatively rotatable collar 21 at the hub of the tire building wheel 19 can be released by rotating the handle 20 to pivot an arm 22 about pins 23 and pull a section 24 of the rim of the wheel 19 about a pin 25 toward the center of the wheel 19. This allows a second section 26 of the rim of the wheel 19 normally supported by the first section 24 to swing toward the center of the wheel 19 about a pin 27. Such movement of the sections 24 and 26 allows a tire casing to be placed on or removed from the wheel 19.

The tire building wheel 19 is rotatably mounted via a shaft 30 on a frame 31 for the machine 10, and may be rotated by a variable speed main drive motor 32 coupled to the shaft 30 by two chain and sprocket drives 33 and a speed reducer 34. While the tire building wheel 19 is illustrated as means for supporting a tire for movement past the applying station 12, a tire builder of the aforementioned Mono-Band type could also be used to perform this function.

Figures 4, 9, 10, 12:
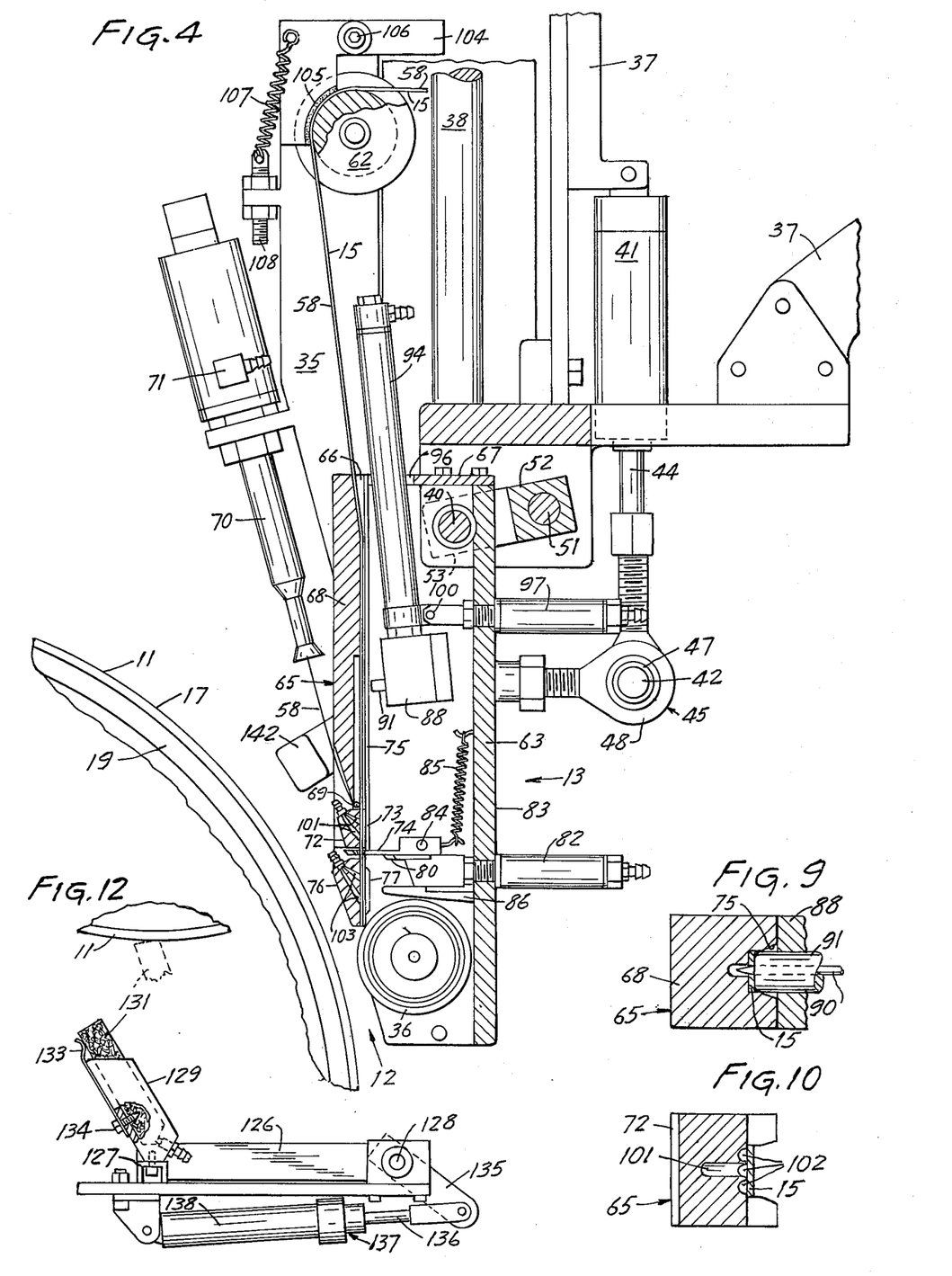
FIG. 4 is an enlarged fragmentary view of a strip applying head on the device of FIG. 1, having parts thereof broken away to show details.
FIG. 9 is an enlarged fragmentary sectional view taken approximately along line 9—9 of FIG. 5.
FIG. 10 is an enlarged fragmentary sectional view taken approximately along line 10—10 of FIG. 5.
FIG. 12 is an enlarged fragmentary view, partially in section of a solvent applicator on the device of FIG. 1.

The device 10 includes means mounting the head assemblies 13 and 14 for movement between a first raised position spaced from the tire building wheel 19 to afford changing the tire casing 11 on the tire building wheel 19 (shown in partial dotted outline in FIG. 1), and a second lowered position closely adjacent the tire building wheel 19 (FIGS. 1, 2, and 4). In the lowered position of the head assemblies 13 and 14 a head 35 in each head assembly can be moved between a retracted position closely spaced from a tire casing 11 on the wheel 19 (FIG. 4), and an applying position (FIGS. 1 and 8) with a rotatable applying wheel 36 in the head pressing the strip material 15 into engagement with the tire casing 11.

Both of the head assemblies 13 and 14 are mounted on a frame portion 37 which includes two parallel rods 38 slidably mounted on the frame 31. An air cylinder 39 is mounted on the frame 31 between and parallel to the rods 38 and has its piston rod attached to the frame portion 37 so that, upon proper activation, the air cylinder 39 can cause movement of the head assemblies 35 between their raised position and their lowered position which is positively defined when a pair of collars at the upper ends of the rods 38 abut the frame 31 under the continuous application of pressure from the air cylinder 39.

The heads 35 are each mounted on a shaft 40 fixed to the frame portion 37 for pivotal movement between their retracted and applying positions. An air cylinder 41 is pivotably mounted between the heads 35 and the frame portion 37 to provide means for moving the heads 35 between their retracted and applying positions. The coupling between the cylinder 41 and heads 39 (best seen in FIG. 2) includes a rod 42 which extends through a self aligning bearing 43 attached at the end of a piston rod 44 for the cylinder 41, and has its ends extending from the bearing 43 extending through a pair of self aligning bearings 45 attached to the heads 35 and flanking the self aligning bearing 43 on the piston rod 44, with each end of the rod 42 being coupled to the frame portion 37 by a spring 46.

As is best seen in FIG. 4, the self aligning bearings 43 and 45 are of the commercially available type including a generally spherical bearing member 47 having a bore in which the rod 42 is received. The spherical bearing member 47 is retained in a support 48 which allows the spherical bearing member 47 to rotate about any axis so long as such rotation does not cause contact between the rod 42 and the support 48. Thus the rod 42 and self aligning bearings 43 and 45 provide means affording relative pivotal movement between the heads 35 when in their applying position to allow each head 35 to independently follow the contour of a tire casing 11 on the tire building wheel 19. When the heads 35 are moved to their retracted position the springs 46 position the ends of the rod 42 and thereby the heads 35 at a position generally uniformly spaced from the tire building wheel 19.

Figure 3:
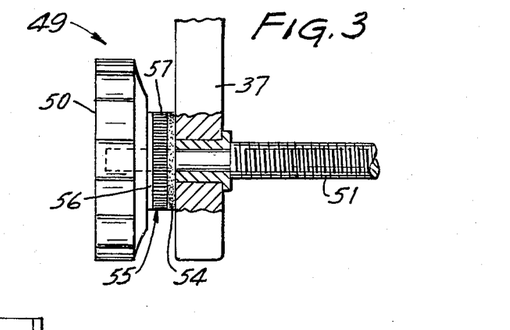
FIG. 3 is an enlarged fragmentary view, partially in section, of a strip spacing adjustment mechanism on the device of FIG. 1.

The contact points between the strips of material 15 on the applying wheels 38 and a tire casing 11 on the tire building wheel 19 can be adjusted axially of the tire casing 11 by a pair of identical adjustment devices 49 between the heads 35 and the frame portion 37. Each of the adjustment devices 49 may be independently operated by rotating a knob 50 to move the head 35 which it positions axially of the tire building wheel 19. As is best seen in FIGS. 2 and 3, on each adjustment device 49 the knob 50 is attached to a rod 51 having a threaded end. The rod 51 is rotatably mounted through a bearing in the frame portion 37 and has a shoulder which bears against the end of the bearing opposite the knob 50 to prevent axial movement of the rod 51 relative to the frame portion 37. Each head 35 is mounted for axial sliding movement on the shaft 40, and the end of each rod 51 threadably engages a clevis-like member 52 having projecting ends contacting opposite sides of the adjacent head 35 and slidably mounted on the shaft 40 (see FIG. 4). Rotation of the rod 51 by manual rotation of the knob 50 will move the clevis-like member 52 thereby the head 35 either way from or toward the knob 50, while the head 35 is free to pivot about the shaft 40 within the clevis-like member 52.

Each adjustment device 49 also includes means for restricting rotation of the knob 50 until a predetermined torque is applied thereto to restrict unwanted changes in the adjustment as might be caused by vibration or inadvertent brushing against the knob 50. A layer of open mesh material 54 (e.g. conventional metal window screen) is secured to the frame portion 37 adjacent the knob 50. A layer of brush-like material 55 has a backing layer 56 attached to the surface of the knob 50 adjacent the open mesh material 54 and has a multiplicity of resilient bristles 57 embedded in the backing layer 56 and projecting toward and into the openings in the open mesh material 54. The ends of the resilient bristles 57 must be deflected by a predetermined torque to afford rotation of the knob 50. A preferred brush-like material 51 is that commercially designated VN-100 Vertically Oriented "Fibre-Tran" material and sold by Minnesota Mining and Manufacturing Company of St. Paul, Minn., which comprises 50 denier nylon bristles projecting about 0.15 inch normally from a flexible backing at a density of about 8,000 to 10,000 bristles per square inch of backing.

The application head assemblies 13 and 14 each include one of the heads 35 and are arranged as mirror images of each other. Each application head assembly 13 or 14 includes means for supporting a supply length of the strip material 15, means for defining a path for an end of the supply length of strip material 15 to the applying wheel 38, and separate means along the path for (1) removing a protective liner 58 from the strip material; (2) severing the strip material moving along the path; (3) advancing an end of the strip material 15 from the severing means to the applying wheel 38; and (4) providing a generally constant predetermined tension in strip material 15 moving along the path.

Figure 5:
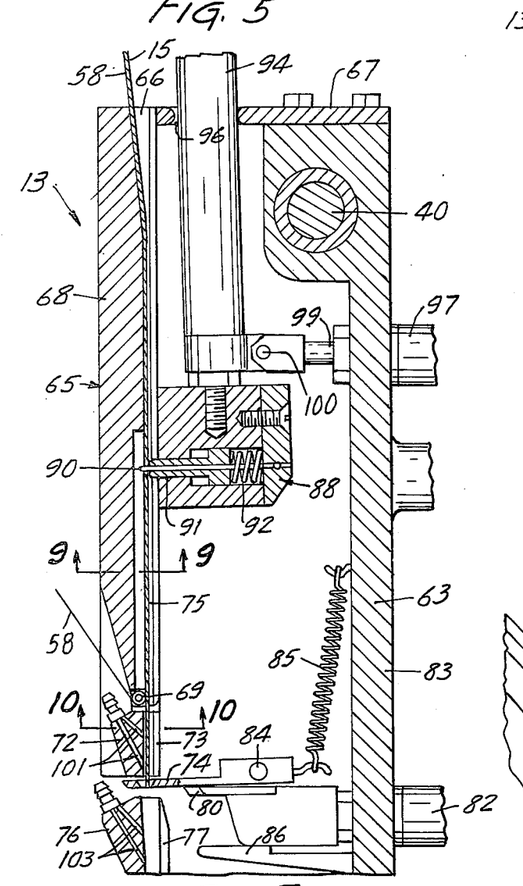
FIGS. 5 through 8 are enlarged fragmentary views of the head in FIG. 4 showing an operational sequence thereof.
Figure 6:
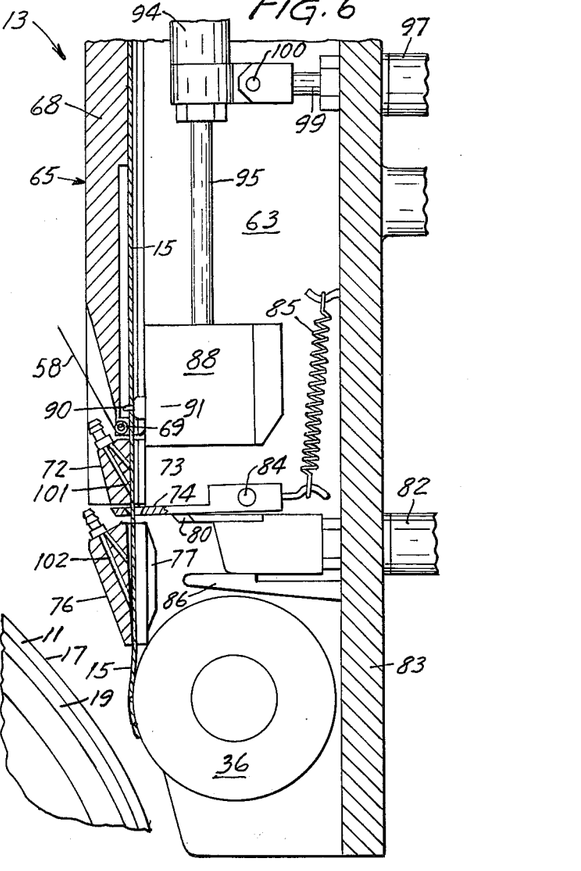

Each application head assembly 13 or 14 includes a reel support mechanism 59 for releasably supporting a reel 60 wound with a supply length of the strip material 15 to which is adhered the protective liner 58, and two flanged, rotatable guide rollers 61 and 62 which guide the strip material 15 and adhered liner 58 from the reel 60 to the pivotal head 35 and provide a portion of the tension control means as will later be explained. Each head 35 includes a generally rectangular rigid box-like member 63 having a central opening over which a cover 64 is removably positioned and an arm 78 projecting from the box-like memeber 63 on which the guide roller 62 is mounted. Each head 35 is pivotably mounted on the shaft 40 adjacent one end of its box-like member 63, and rotatably supports the applying wheel 36 adjacent the other. Each head 35 also includes means defining a generally linear portion of the path for the strip material 15 along a groove in a front wall 65 of the box-like member 63 from an inlet opening 66 in an end wall 67 adjacent the shaft 40, to the periphery of the applying wheel 36. The path portion on the head 35 extends along a groove 75 in a first portion 68 of the wall 65 (FIGS. 5 and 9) from the inlet opening 66 to a small rotatably mounted roller 69 around which the liner 58 is sharply separated from the strip material 15 at a small included angle with the liner along the front wall 65. From the roller 69 the liner 58 extends into a separate liner discharge assembly for each head assembly 13 or 14 including an inlet tube 70 leading to a venturi portion 71. Air is directed into a central liner receiving opening in the venturi portion 71 in a diverging conical pattern directed away from the inlet tube 70 to provide a constant tension on the separated liner 58, and to discharge the liner 58 from an outlet end of a flexible tube coupled to the venturi portion 71. The end of the circular inlet tube 70 adjacent the roller 69 is flattened to form an oval cross section aligned with the width of the liner 58. This oval cross section has been found to allow liner removal rates of over 6 feet per second without excessive vibration of the liner in the venturi portion 71 which vibration (which occurs without the oval cross section) can severely limit the rate of liner removal.

From the roller 69 the strip material 15 extends along a slot between a second portion 72 of the front wall and a guide wall 73 after which the strip material 15 extends through a slot in a first severing member 74 (included in severing means later to be explained) having an end positioned in an opening between the second portion 72 and a third portion 76 of the front wall 65. From the first severing member 74 the path for the strip material 15 extends along a slot between the third portion 76 of the front wall 65 and a guide wall 77 and then onto the periphery of the applying wheel 38.

The means for severing the strip material 15 moving along the path includes the slotted first severing member 74 and a second severing member or knife 80 attached to a knife support fixed on the end of a piston 81 in a spring return air cylinder 82 secured to a rear wall 83 of the box-like member 63. The piston 81 is positioned, upon activation, to move a leading edge of the knife 80 along the adjacent surface of the first severing member 74 and sever the strip material 15 passing through the slot therein. The first severing member 74 is mounted for slight pivotal movement about a pin 84 and is biased toward engagement with the knife 80 by a spring 85. The knife support is guided on its side opposite the first severing member 74 by a support 86 projecting from the rear wall 83. The spring 85 and support 86 insure a close shearing engagement between the leading edge of the knife 80 and the edge of the slot furthest from the air cylinder 82 to cleanly sever the strip material 15.

The means for advancing an end of the strip material 15 from the severing means to the applying wheel 36 includes an advance block 88 supported in the central opening in the box-like member 63 in advance of the severing means and on the side of the path opposite the front wall 65. The advance block 88 includes means adapted for making engagement with the strip material 15, and the advancing means includes means for moving the advance block 88 from a disengaged position spaced from the strip material 15 along the path, sequentially (1) to an engaged position engaged with the strip material, (2) along the path toward the severing means with the block 88 engaged with the strip material 15 for a distance sufficient to move an end of the strip material originally at the severing means to the applying wheel 38, and (3) back to the disengaged position.

The means adapted for making engagement with the strip material 15 includes a needle 90 fixed to the advance block 88 and projecting from the surface thereof adjacent the first portion 68 of the wall 65 in a position to pierce the strip material 15 when the advance block 88 is moved to its engaged position. A stepped cylindrical protective sleeve 91 having a central opening is mounted for axial sliding movement in the advance block 88 with the needle 90 positioned in the opening.

The sleeve 91 is biased by a spring 92 to an outer position enclosing the projecting tip of the needle 90, and will be moved inwardly of the advance block 88 against the bias of the spring 92 to allow the tip of the needle 90 to project and pierce the strip material 15 when the sleeve 91 is pressed against the strip material 15. Subsequent to such piercing as the advance block 88 is again moved to its disengaged position the spring loaded sleeve 91 will provide means for pressing the strip material 15 from the needle 90 to prevent movement of the strip material 15 with the needle 90.

Figure 7:
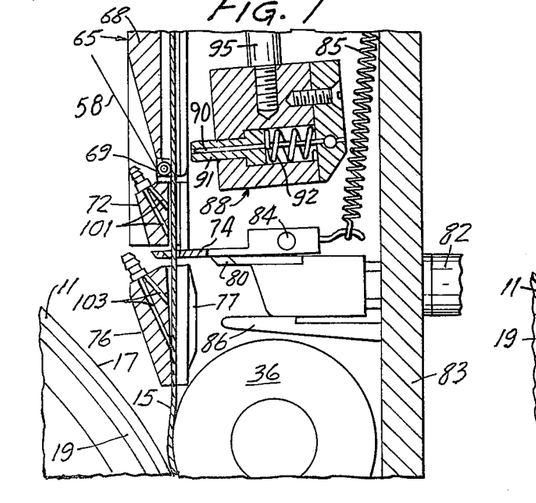
Figure 8:
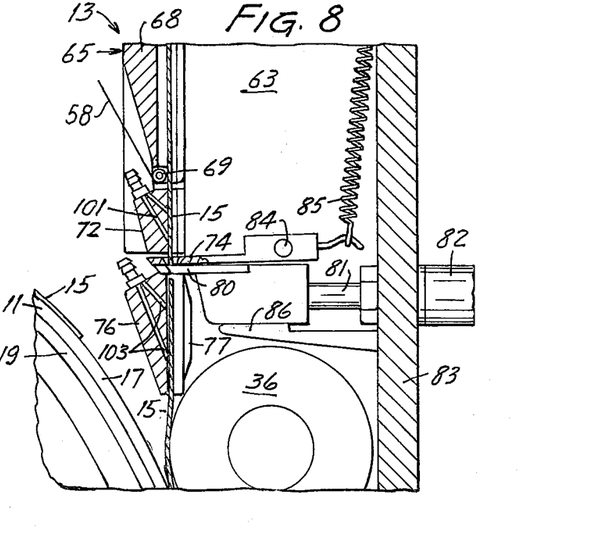

The means for moving the advance block 88 between its disengaged and engaged positions and along the path to advance the strip material 15 is best seen in FIGS. 4 through 8. It includes a first spring return air cylinder 94 having a piston rod 95 on which the advance block 88 is fixedly attached. The housing of the cylinder 94 is loosely positioned in an opening 96 through the end wall 67 of the box-like member 63. A second spring return air cylinder 97 has its housing fixed in the rear wall 83 of the box-like member 63 and extends at approximately a right angle to the first air cylinder 94. The cylinder 97 has a piston rod 99 pivotably attached at a pin 100 to the first air cylinder 94 at its end adjacent the advance block 88. With both the cylinders 94 and 94 deactivated the advance block 88 will be positioned at a first disengaged position (FIG. 4) adjacent the end wall 67 with the needle 90 spaced from the strip material 15 along the front wall 65. Upon subsequent activation of only the second cylinder 97 the advance block 88 will be moved to its first engaged position (FIG. 5) with the advance block 88 against the first portion 68 of the front wall 65 and the needle 90 piercing the strip material 15 in the groove 75 with its tip in a trough centrally extending along the bottom of the groove 75 (FIG. 9). Subsequent activation of the first cylinder 94 while the second cylinder 97 remains activated causes the advance block 88 to move along the first portion 68 of the front wall 65 with the needle 90 engaged through the strip material 15 to a second engaged position (FIG. 6) which is a sufficient distance to move an end of the strip material 15 from the first severing member 74 to the surface of the applying wheel 36. Subsequent deactivation of the second air cylinder 97 while the first air cylinder 97 remains activated will cause the advance block 88 to be moved to a second disengaged position adjacent the applying wheel 36 with the needle 90 out of engagement with the strip material 15 (FIG. 7).

The advancing means also includes means for aiding free movement of the strip material 15 from the liner 58 separating means to the applying wheel 36 by insuring that its end or tacky surface from which the liner has been separated will not catch on or stick to the second and third portions 72 and 76 of the front wall 65. The second portion 72 of the front wall 65 is formed with two air passageways 101 oriented to direct a jet of air against the adjacent surface of strip material moving along the second front wall portion 72. Also the second front wall portion 72 has three adjacent parallel grooves 102 extending along the path for the strip material 15 (see FIG. 10). This combination of a grooved surface and air passageways 101 provides an air cushion which urges the strip material against the adjacent guide wall 73 and prevents the sticky surface of the strip material 15 from contacting and sticking to the second front wall portion 72 due to the forces applied by the separation of the liner 58.

As illustrated, the third front wall portion 76 may also be formed with two air passageways 103 directed to urge the strip material 15 against the adjacent guide wall 77 and along the path toward the applying wheel 36.

The means for providing a generally constant predetermined tension in strip material 15 moving along the path include an adjustable brake means adapted for contacting the strip material 15 as it passes over the guide roller 62, and a brake system adapted to afford free rotation of the reel 60 when strip material 15 is withdrawn by the device 10, while restricting rotation of the reel 60 due only to momentum to prevent the spilling of the strip material 15 from the reel 60 as when the withdrawal of strip material 15 is slowed or terminated.

The adjustable brake means includes a brake plate 104 having an arcuate edge surface to which is attached a brush-like braking material 105 adapted to contact the strip material 15 on the roller 62. The brake plate 104 is mounted for pivotal movement about a pin 106 between a first position with the brake material 105 spaced from the roller 62 to afford positioning the strip material 15 thereon, and an engage position with the brake material 105 in engagement with the strip material 15 on the roller 62 to which the plate 104 is biased by a spring 107 adjustably attached between the brake plate 104 and a bolt 108 on the arm 78 of the head 35. The braking material 105 comprises a resilient flexible backing layer attached to the plate 104 from which project a multiplicity of flexible resistant bristles; a preferred braking material being the same as that used for the brush-like materials 55 on the adjustment devices 49. When pressed against the strip material 15 the resilient bristles deflect to provide a very uniform braking pressure so that proper selection of the spring 107 and adjustment of the bolt 108 will provide a very uniform predetermined tension in the strip material 15.

Figure 11:
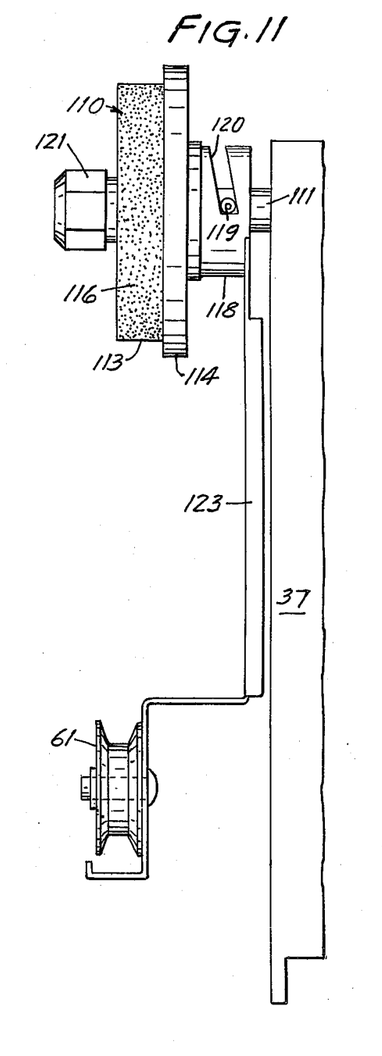
FIG. 11 is an enlarged fragmentary view of a reel hub brake mechanism on the device of FIG. 1.

The brake system for the reel 60, best seen in FIG. 11, includes a hub 110 rotatably mounted on a shaft 111 cantilevered from the frame portion 37. The hub 110 has a cylindrical surface 113 adapted to frictionally fit into a cylindrical opening in the reel 60, and a flange 114 adjacent the frame portion 37 adapted to abut the side of and properly axially position a reel 60 pressed onto the hub 110. The cylindrical surface 113 is defined by the ends of bristles in a layer of brush-like material 116. The brush-like material 116 has a resilient flexible molded backing layer from which project a multiplicity of the resilient flexible bristles and is similar to that used in the adjusting device 49 and on the brake plate 104 except that the bristles are all oriented in the same direction at an angle of less than 90° with the backing. The ends of the bristles resiliently deflect when a reel 60 is pressed thereon. The bristle tips on the brush-like material 116 are oriented generally toward the flange 114 and around the periphery of the hub 110 in a direction contra to that toward which the reel 60 which rotate as the strip material 15 is withdrawn to restrict axial movement of the reel 60 from the hub 110 and rotation of the reel 60 relative to the hub 110 as the strip material 15 is withdrawn by the device 10.

The brake system for the reel 60 also includes a disk of brake material 117 positioned on one side of the hub 110, a cam member 118 rotatable on the shaft 111, and and axially extending pin 119 fixed on the shaft 111 and movable in a slot along a cam surface 120 in the cam member 118 between a braking position compressing the disk of brake material 117 between the cam 118 and a lock nut 121 on a threaded end of the shaft 111 to restrict rotation of the hub 110; and a release position providing no pressure on the disk of brake material 117 to afford free rotation of the hub 110 and reel 60. An arm 123 is attached to one end to the cam member 118 and rotatably supports the guide roller 61 on its opposite end. The arm 123 is attached to move the cam member 118 toward its release position when the arm 123 is moved from the vertical toward the guide roller 62, as will result from the tension in the strip material 15 when it is withdrawn from the reel 60 during application thereof to a tire casing 11; and to move the cam member 118 to its braking position when the arm 123 moves toward a position vertically below the reel 60. Thus the weight of the arm 123 provides means for biasing toward its braking position. Such braking action will restrict rotation caused only by the momentum of the reel 60 and consequent spilling of the strip material 15 from the reel 60.

The device 10 also includes means for applying a solvent (e.g. Toluene) to a tire casing 11 prior to application of the strip material 15 to afford adhesive contact therebetween. Referring now to FIGS. 1, 2, and 12, the solvent applying means includes a T-shaped arm 126 fixed at its end opposite its cross member 127 to a shaft 128 pivotally mounted on the frame 31. Two spaced sockets 129 are adjustably attached by bolts through slots along the cross member 127. Each socket 129 contains a wick 131 of an absorbent material such as felt or an adsorbent fibrous web of the type taught in U.S. Pat. No. 3,764,527 incorporated by reference herein. An end of the wick 131 extends from the open end of the socket 129 and is supported on its side opposite the building wheel 19 by a cantilevered end on a spring 133. The spring 133 is secured to the socket by a cap screw 134 which passes through the spring 133 and the wall of the socket 129 and has a pointed end which engages and secures the wick 131 within the socket 129.

A pivot arm 135 has one end fixed to the shaft 128 and the other pivotably mounted to a piston rod 136 in an air cylinder 137. A housing 138 for the air cylinder 137 is pivotably mounted on the frame 31. Proper activation of the air cylinder 137 provides means for moving the arm 126 between a retracted position with the wicks 131 spaced from a tire casing 11 on the tire building wheel 19 (FIGS. 1, 2 and 12), and an applying position (dot, FIG. 1) with the wicks 131 pressed against the tire casing 11 in the area to which the strip material 15 will subsequently be applied and biased into contact therewith by the springs 133 to wipe solvent absorbed by the wick 131 onto the tire casing 11.

An inlet tube 140 communicates between each socket 129 and a tank (not shown) containing solvent maintained at a level between the opening and bottom of the sockets 128 in their retracted positions, so that in that position at least a portion of each wick 131 will be immersed in solvent.

The device 10 also includes an electronic and pneumatic control system which may include a plurality of cams rotated by a timing motor to sequentially activate various portions of the device to successively apply lengths of the strip material 15. The manual operations required and the operation of the control system in the device 10 to apply parallel strips of reflex-reflective strip material to a tire casing 11 will now be described. Initially the strip applying head assemblies 13 and 14 in their raised position. The operator releases the over center device which supports the pivotal sections 25 and 26 of the rim of the tire building wheel 19 by rotating the handle 21. He then positions an unvulcanized tire casing 11 around the tire building wheel 19, repositions the rim section 26 and returns the handle 21 to its locked position to press the section 25 against the section 26 and tension the tire casing 11 about the wheel 19. If necessary, for each head assembly 13 or 14 the operator threads an end of the strip material 15 from a supply reel 60 placed on the hub 110 along the path defined by the rollers 61 and 62 and through the inlet opening 66 into the head 35. At the roller 69 the protective liner 58 on the strip material 15 is separated and threaded around the roller 69, and into the inlet tube 70, and the airflow into the venturi section 71 is started to apply tension on the liner. The end of the strip material 15 is threaded between the second portion 72 of the front wall 65 and the guide wall 73 and through a slot in the first severing member 74. The severing mechanism is then activated by pressing a button on a control panel 125 to activate the air cylinder 97 to move the advance block 88 to its first engaged position (FIG. 5) with the needle 90 piercing the strip material 15, and momentarily activate the air cylinder 82 to sever the strip material 15 at the first severing member 74. The length severed from the strip material 15 is then discarded.

The operator then activates the device 10 by pressing a start button 127 on the control panel 125. The control system first activates the motor 32 to rotate the tire building wheel 19 at a first high rate of speed (e.g. about 4 feet per second peripheral speed) and then activates the air cylinder 137 to move the arm 126 to its applying position so that the wicks 131 will wipe solvent on the moving tire casing 11. After about one complete revolution of the tire casing 11, the control system activates the air cylinder 137 to return the arm 126 to the retracted position with the wicks 131 spaced from the tire casing and allows the tire casing 11 to rotate for several seconds to allow any excess solvent on the tire casing 11 to evaporate. The control system having activated the air cylinder 39 to move the head assemblies 13 and 14 to their lowered position, and the air cylinder 94 to move the advance block 88 to its second engaged position to push the end of the strip material 15 to the periphery of the applying wheel 36, then decreases the speed of the motor 32 so that the tire casing is rotated at a second slower speed (e.g. about one foot per second peripheral speed). Next the control system simultaneously deactivates the air cylinder 97 to move the advance block 88 to its second disengaged position and activates the air cylinder 41 to move the heads 35 to their applying position with the applying wheels 36 pressing the ends of the lengths of strip material 15 against the moving tire casing 11. The speed of the motor 32 is then increased to its first speed. As the tire building wheel 19 rotates, the strip material 15 is pulled under each of the applying wheels 36. Tension in each strip material 5 pulls its guide roller 63 toward the guide roller 64, releasing the brake means at its reel 60 and allowing the reel 62 to rotate freely, while pressure from the brush-like brake material 105 on the brake plates 104 produces a uniform predetermined tension in the lengths of strip material 15 under the applying wheels 36. Also, the liners 58 are removed from the strip materials 15 by the air passing through the liner discharge assemblies. The control system operates the drive motor 32 at the first high speed for an adjustable time which is predetermined to apply the strip materials for all but about 6 inches of the distance around the tire casing 11, afte which the control system again switches the motor 32 to operate at the second slower speed. When a photoelectric sensor 142 for each head 35 signals that the end of the strip material 15 is being rotated back toward the the applying station 12, the control system starts an adjustable separate timer for that head 35 which, when timed out, activates the second air cylinder 97 for that head 35 to again press the advance block 88 into engagement with the strip material 15 at its first engaged position, and simultaneously momentarily activates the air cylinder 82 to sever the strip material. The control means then activates the air cylinder 41 to move the heads 35 to their spaced position, and then activates the air cylinder 39 to move the head assemblies 13 and 14 to their raised position so that the operator can operate the handle 29 to remove the striped tire casing from the tire building wheel 19. The device is then in a ready condition with the supply lengths of strip material 15 held along the paths by the advance blocks 88 with their ends at the first severing members 74 in the strip applying heads 13 and 14 ready for application thereof to a new tire casing positioned on the tire building wheel 19.

We claim:

1. In a device adapted for adhesively applying lengths of elastic reflex-reflective strip material to tire casings, comprising means adapted for driving a said tire casing along a tire casing path past an applying station; a head assembly including a frame, an applying wheel rotatably mounted on said frame, and means for defining a path for said strip material along said frame including means for defining a path portion relative to said frame partially around said applying wheel; and means mounting said head assembly for movement between a first position spaced from said applying station and an applying position with said wheel positioned to press strip material along the path portion thereon against the tire casing at said applying station to apply strip material as the tire casing is driven past the applying station: the improvement wherein said device includes solvent applicating means along said tire casing path for applying to said casing a solvent capable of affording adhesive contact between said tire casing and said strip material;

severing means along the path for said strip material and spaced from said applying wheel for severing said strip material along said path;

advancing means for advancing an end of said strip material from said severing means to said path portion on said applying wheel comprising a wall in said head assembly along said path in advance of said severing means adapted to support one surface of said strip material, an advance block including means adapted for engagement with said strip material, and means for mounting said advance block for movement sequentially (1) from a disengaged position spaced from strip material along said wall to a position with said engagement means engaged with said strip material, (2) along said wall toward said severing means with the engagement means of said block engaged with said strip material for a distance sufficient to move an end of the strip material from said severing means to said applying wheel, and (3) back to said disengaged positions;

positioning means for moving said head assembly between said first and applying positions;

tensioning means along said path for providing a uniform predetermined tension in strip material moving along said path at said applying wheel; and a control system for sequentially operating said device including:

means for operating said advancing means to move said advance block from said engage position along said wall to advance an end of said strip material from said severing means to said applying wheel and for then returning said advance block to said disengage position;

means for activating said positioning means to move said head to its applying position after the end of said strip material is at said applying wheel;

means for activating said solvent applicating means for a time sufficient to apply solvent entirely around the tire casing prior to movement of said head to its applying position;

means mounted along said casing path when said head is in said applying position adapted for sensing the end of a length of said strip material applied on a said tire casing driven past said sensing means and for producing a signal in response thereto;

means for receiving said signal and activating said severing means at a predetermined time after said signal is received to provide a desired relationship between the ends of the applied strip material; and means for operating said positioning means to return said head assembly to its first position after the operation of said severing means.

2. A device according to claim 1, wherein said advance block has an opening and said engagement means adapted for engagement with said strip material comprises a needle fixed to said advance block and having a pointed tip projecting from a surface of said block centrally through said opening; a cylindrical sleeve slidably mounted in said opening and having an axially extending central opening receiving said needle, said sleeve being slidable relative to said advance block between a first position enclosing the needle, and a second position with the tip of said needle projecting from one end of said cylinder; and means for biasing said sleeve to said first position.

3. In a device adapted for adhesively applying lengths of elastic reflex-reflective strip material to tire casings from a supply length of strip material having a protective liner applied thereto, comprising means adapted for driving a said tire casing along a tire casing path past an applying station; a head assembly including a frame, an applying wheel rotatably mounted on said frame, and means for defining a path for said strip material along said frame including means for defining a path portion relative to said frame partially around said applying wheel; means mounting said head assembly for movement between a first position spaced from said applying station and an applying position with said wheel positioned to press strip material along the path portion thereon against the tire casing at said applying station to apply strip material as the tire casing is driven past the applying station; and separating means along said path in advance of said applying wheel adapted for pulling said liner from said strip material: the improvement wherein said device includes solvent applicating means along said tire casing path for applying to said casing a solvent capable of affording adhesive contact between said tire casing and said strip material;

severing means along the path for severing said strip material along said path said severing means being spaced from said applying wheel and being positioned between said applying wheel and said separating means along said path;

guide means for guiding said strip material from said separating means to said applying wheel comprising guide members adapted to support the surface of said strip material opposite that from which the liner is separated, and means for directing air under greater than atmospheric pressure toward said guide members to position strip material between said separating means and applying wheel against said guide members;

advancing means for advancing an end of said strip material along said guide means from said severing means to said path portion on said applying wheel;

positioning means for moving said head assembly between said first and applying positions;

tensioning means along said path for providing a uniform predetermined tension in strip material moving along said path at said applying wheel; and a control system for sequentially operating said device including:

means for operating said advancing means to advance an end of said strip material along said guide means from said severing means to said applying wheel;

means for activating said positioning means to move said head to its applying position after the end of said strip material is at said applying wheel;

means for activating said solvent applicating means for a time sufficient to apply solvent entirely around the tire casing prior to movement of said head to its applying position;

means mounted along said casing path when said head is in said applying position adapted for sensing the end of a length of said strip material applied on a said tire casing driven past said sensing means and for producing a signal in response thereto;

means for receiving said signal and activating said severing means at a predetermined time after said signal is received to provide a desired relationship between the ends of the applied strip material; and means for operating said positioning means to return said head assembly to its first position after the operation of said severing means.

4. A device according to claim 3, wherein said air directing means includes a member having a surface defined by adjacent parallel grooves in said member and aligned along said path and a generally centrally located opening into said grooves, and means for directing air under greater than atmospheric pressure through said opening into said grooves.

5. In a device adapted for adhesively applying lengths of elastic reflex-reflective strip material to tire casings from a supply length of strip material having a protective liner applied thereto comprising means adapted for driving a said tire casing along a tire casing path past an applying station; a head assembly including a frame, an applying wheel rotatably mounted on said frame, and means for defining a path for said strip material along said frame including means for defining a path portion relative to said frame partially around said applying wheel; means mounting said head assembly for movement between a first position spaced from said applying station and an applying position with said wheel positioned to press strip material along the path portion thereon against the tire casing at said applying station to apply strip material as the tire casing is driven past the applying station; separating means along said path in advance of said applying wheel adapted for pulling said liner from said strip material comprising a tubular venturi having an inlet opening and an outlet opening; means for directing air into said venturi and out said outlet opening to pull a liner entering at said inlet opening through said venturi and out said outlet opening: the improvement wherein said device includes solvent applicating means along said tire casing path for applying to said casing a solvent capable of affording adhesive contact between said tire casing and said strip material;

severing means along the path for severing said strip material along said path said severing means being spaced from said applying wheel and being positioned between said applying wheel and said separating means along said path;

advancing means for advancing an end of said strip material from said severing means to said path portion on said applying wheel;

positioning means for moving said head between said first and applying positions;

tensioning means along said path for providing a uniform predetermined tension in strip material moving along said path at said applying wheel; and a control system for sequentially operating said device including:

means for operating said advancing means to advance an end of said strip material from said severing means to said applying wheel;

means for activating said positioning means to move said head to its applying position after the end of said strip material is at said applying wheel;

means for activating said solvent applicating means for a time sufficient to apply solvent entirely around the tire casing prior to movement of said head to its applying position;

means mounted along said casing path when said head is in said applying position adapted for sensing the end of a length of said strip material applied on a said tire casing driven past said sensing means and for producing a signal in response thereto;

means for receiving said signal and activating said severing means at a predetermined time after said signal is received to provide a desired relationship between the ends of the applied strip material; and means for operating said positioning means to return said head assembly to its first position after the operation of said severing means;

and wherein said separating means further comprises a tubular inlet tube coupled to said inlet opening of said venturi and having an inlet end, a portion of said inlet tube adjacent said inlet end being flattened to form an oval cross section.

6. In a device adapted for adhesively applying lengths of elastic reflex-reflective strip material to tire casings, comprising means adapted for driving a said tire casing along a tire casing path past an applying station; a head assembly including a frame, an applying wheel rotatably mounted on said frame, and means for defining a path for said strip material along said frame including a guide pulley defining a portion of the path for said strip material and means for defining a path portion relative to said frame partially around said applying wheel; and means mounting said head assembly for movement between a first position spaced from said applying station and an applying position with said wheel positioned to press strip material along the path portion thereon against the tire casing at said applying station to apply strip material as the tire casing is driven past the applying station: the improvement wherein said device includes     solvent applicating means along said tire casing path for applying to said casing a solvent capable of affording adhesive contact between said tire casing and said strip material;

severing means along the path for said strip material and spaced from said applying wheel for severing said strip material along said path;

advancing means for advancing an end of said strip material from said severing means to said path portion on said applying wheel;

positioning means for moving said head between said first and applying positions;

tensioning means along said path for providing a uniform predetermined tension in strip material moving along said path at said applying wheel comprising a brush-like brake material including a backing and a plurality of stiff resilient bristles embedded in and projecting from said backing, said backing being curved in a radius to afford contact of the distal ends of said bristles on a strip material extending around a portion of said guide pulley, means mounting said brake material for movement from a disengaged position with the tips of said bristles spaced from strip material on said guide pulley, to an engaged position with said bristle tips in engagement with strip material on said guide pulley, and means for biasing said brake material toward said engaged position with an adjustable predetermined force; and     a control system for sequentially operating said device including:

means for operating said advancing means to advance an end of said strip material from said severing means to said applying wheel;

means for activating said positioning means to move said head to its applying position after the end of said strip material is at said applying wheel;

means for activating said solvent applicating means for a time sufficient to apply solvent entirely around the tire casing prior to movement of said head to its applying position;

means mounted along said casing path when said head is in said applying position adapted for sensing the end of a length of said strip material applied on a said tire casing driven past said sensing means and for producing a signal in response thereto;

means for receiving said signal and activating said severing means at a predetermined time after said signal is received to provide a desired relationship between the ends of the applied strip material; and         means for operating said positioning means to return said head assembly to its first position after the operation of said severing means.

7. A device according to claim 6, wherein said device is adapted to receive a supply length of said strip material wound on a reel having a central opening and said tensioning means further include a rotatably mounted cylindrical hub, a layer of brush-like material about the periphery of said hub comprising a backing attached to said hub and a plurality of resilient bristles embedded in and projecting outwardly from said backing, said bristles being deformable to receive said reel about said central opening and releasably retain said reel about said hub to restrict removal of said reel from said hub or rotation of said reel relative thereto, and said device includes means coupled to said hub for affording free rotation of said hub and reel and when strip material is withdrawn by said device, and for braking rotation of said hub and reel when withdrawal of said strip material is terminated by said device.

8. A device according to claim 1, wherein said solvent applicating means comprises a socket having an opening, an absorbent wick within and projecting from said opening, means for moving said socket between a retracted position with the projecting portion of said wick spaced from a said tire casing along said tire casing path and an applying position with the projecting portion of said wick contacting a said tire casing along the tire casing path, and means for providing solvent in said socket when said socket is in said retracted position.

9. In a device adapted for adhesively applying lengths of elastic reflex-reflective strip material to tire casings, comprising means adapted for driving a said tire casing along a tire casing path past an applying station; a head assembly including a frame, an applying wheel rotatably mounted on said frame, and means for defining a path for said strip material along said frame including means for defining a path portion relative to said frame partially around said applying wheel; and means mounting said head assembly for movement between a first position spaced from said applying station and an applying position with said wheel positioned to press strip material along the path portion thereon against the tire casing at said applying station to apply strip material as the tire casing is driven past the applying station: the improvement wherein said device includes     solvent applicating means along said tire casing path for applying to said casing a solvent capable of affording adhesive contact between said tire casing and said strip material;

severing means along the path for said strip material and spaced from said applying wheel for severing said strip material along said path;

advancing means for advancing an end of said strip material from severing means to said path portion on said applying wheel;

positioning means for moving said head between said first and applying positions;

tensioning means along said path for providing a uniform predetermined tension in strip material moving along said path at said applying wheel;

a control system for sequentially operating said device including:

means for operating said advancing means to advance an end of said strip material from said severing means to said applying wheel;

means for activating said positioning means to move said head to its applying position after the end of said strip material is at said applying wheel;

means for activating said solvent applicating means for a time sufficient to apply solvent entirely around the tire casing prior to movement of said head to its applying position;

means mounted along said casing path when said head is in said applying position adapted for sensing the end of a length of said strip material applied on a said tire casing driven past said sensing means and for producing a signal in response thereto;

means for receiving said signal and activating said severing means at a predetermined time after said signal is received to provide a desired relationship between the ends of the applied strip material; and means for operating said positioning means to return said head assembly to its first position after the operation of said severing means; and adjusting means for axially adjusting the position of said applying wheel relative to said tire casing path, said adjusting means comprising a fixed surface, a knob having a surface parallel to said fixed surface and rotatable relative thereto to afford said adjustment, an open mesh material fixed to one of said surfaces and a brush-like material fixed to the other of said surfaces, said brush-like material including a backing attached to said surface, and a multiplicity of flexible resilient bristles embedded in said backing and projecting into said open mesh material.

10. In a device adapted for adhesively applying lengths of strip material to a surface, comprising means for driving a said surface along a path past an applying station; a head assembly including a frame, an applying wheel rotatably mounted on said frame, and means for defining a path for said strip material along said frame including a portion of the periphery of said applying wheel; and means mounting said head assembly for movement between a first position spaced from said applying station and an applying position with said wheel positioned to press strip material thereon against the surface at said applying station to apply strip material as the surface is driven past the applying station: the improvement wherein said device includes:

severing means along the path for said strip material and spaced from said applying wheel for severing said strip material along said path;

advancing means for advancing an end of said strip material from said severing means to said applying wheel comprising an advance block including means adapted for engagement with said strip material, and means for moving said advance block sequentially (1) from a disengaged position spaced from strip material along said path to a position engaged with said strip material, (2) along said path toward said severing means with said block engaged with said strip material for a distance sufficient to move an end of the strip material from said severing means to said applying wheel, and (3) returning said block to said disengaged position;

guide means along said path between said severing means and said applying wheel for guiding an end of said strip material from said severing means to the periphery of said applying wheel;

positioning means for moving said head between said first and applying positions; and a control system for sequentially operating said device including:

means for operating said advancing means to advance an end of said strip material from said severing means to said applying wheel;

means for activating said positioning means to move said head to its applying position after the end of said strip material is at said applying wheel;

means for activating said severing means at a predetermined time to provide a desired length of the applied strip material; and means for operating said positioning means to return said head assembly to its first position after the operation of said severing means.

11. A device according to claim 8, wherein said means adapted for engagement with said strip material comprises a needle with a tip projecting from a surface of said advance block; a cylindrical sleeve having an axially extending central opening and being mounted on said advance block with said needle in said opening for movement from a first position enclosing the needle, and a second position with the tip of said needle projecting from one end of said cylinder; and means for biasing said sleeve to said first position.

12. A device according to claim 10 and adapted to apply lengths of strip mateial from a supply length of strip material having a protective liner applied thereto, wherein said device further includes separating means along said path in advance of said applying wheel and said severing means, adapted for pulling said liner from said strip material; and said guide means for guiding said strip material from said separating means to said applying wheel comprises guide members adapted to support the surface of said strip material opposite that from which the liner is separated, and means for directing air under greater than atmospheric pressure toward said guide members to position strip material along said path between said separating means and applying wheel against said guide members.

13. A device according to claim 11, wherein said air directing means includes a member having a surface defined by adjacent parallel grooves in said member aligned along said path and a generally centrally located opening into said grooves, and means for directing air under greater than atmospheric pressure through said opening into said grooves.

14. A device according to claim 10 and adapted to apply lengths of strip material from a supply length of strip material having a protective liner applied thereto, wherein said device further includes separating means along said path in advance of said applying wheel and said severing means adapted for pulling said liner from said strip material comprising a tubular venturi having an inlet opening and an outlet opening; means for directing air into said venturi and out said outlet opening to pull a liner entering at said inlet opening through said venturi and out said outlet opening, and a tubular inlet tube coupled to said inlet opening and having an inlet end, a portion of said inlet tube adjacent said inlet end being flattened to form an oval cross section.

* * * * *

UNITED STATES PATENT OFFICE
CERTIFICATE OF CORRECTION

PATENT NO. : 3,944,457
DATED : March 16, 1976
INVENTOR(S) : Richard T. Podvin and Thomas F. Look It is certified that error appears in the above-identified patent and that said Letters Patent are hereby corrected as shown below:

Column 8, line 13, delete "the" (second occurrence).

Column 9, line 8, change "to" (first occurrence) to -- at --; and     line 59, change "128" to -- 129 --.

Column 10, line 2, after "14" insert -- are --; and
    line 62, change "5" to -- 15 --.

Column 11, line 6, change "afte" to -- after --.

In the Claims

Column 12, line 2, change "positions" to -- position --.

Column 16, line 21, delete "and" (second occurrence).

Column 18, line 22, change "claim 8" to -- claim 10 --; and     line 47, change "claim 11" to -- claim 12 --.

Signed and Sealed this eighth Day of June 1976

[SEAL]

Attest:

RUTH C. MASON
*Attesting Officer*

C. MARSHALL DANN
*Commissioner of Patents and Trademarks*